(12) United States Patent
Huang (10) Patent No.: US 8,589,519 B2
(45) Date of Patent: Nov. 19, 2013

(54) METHOD AND DEVICE FOR UNIFORM RESOURCE IDENTIFIER HANDLING OF USER DEVICE

(75) Inventor: Vincent Huang, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 245 days.

(21) Appl. No.: 12/999,377

(22) PCT Filed: Jun. 18, 2008

(86) PCT No.: PCT/SE2008/050727
§ 371 (c)(1),
(2), (4) Date: Dec. 16, 2010

(87) PCT Pub. No.: WO2009/154525
PCT Pub. Date: Dec. 23, 2009

(65) Prior Publication Data
US 2011/0125880 A1    May 26, 2011

(51) Int. Cl.
*G06F 15/177* (2006.01)
(52) U.S. Cl.
USPC .................. 709/220; 709/206; 709/222
(58) Field of Classification Search
USPC .......................................... 713/156; 709/220
See application file for complete search history.

(56) References Cited

U.S. PATENT DOCUMENTS

| | | | |
|---|---|---|---|
| 6,256,747 B1* | 7/2001 | Inohara et al. ................. | 714/4.4 |
| 7,885,871 B2* | 2/2011 | Lee et al. ........................ | 705/35 |
| 7,961,681 B2* | 6/2011 | Wu et al. ........................ | 370/329 |
| 2002/0080783 A1* | 6/2002 | Fujimori ....................... | 370/384 |
| 2002/0099829 A1 | 7/2002 | Richards et al. | |
| 2002/0169986 A1* | 11/2002 | Lortz ............................. | 713/201 |
| 2003/0074402 A1* | 4/2003 | Stringer-Calvert et al. .. | 709/203 |
| 2003/0115342 A1 | 6/2003 | Lortz | |
| 2003/0196087 A1* | 10/2003 | Stringer et al. ............... | 713/171 |
| 2004/0123114 A1* | 6/2004 | McGowan ..................... | 713/186 |
| 2005/0195862 A1* | 9/2005 | Jones et al. .................... | 370/503 |
| 2006/0030320 A1* | 2/2006 | Tammi et al. .............. | 455/435.2 |
| 2007/0206790 A1* | 9/2007 | Yoon ............................... | 380/44 |
| 2007/0266257 A1* | 11/2007 | Camaisa et al. .............. | 713/182 |
| 2008/0316962 A1* | 12/2008 | Wu et al. ........................ | 370/329 |
| 2009/0007239 A1* | 1/2009 | Lindem et al. ................ | 726/4 |
| 2009/0298495 A1* | 12/2009 | Zhu et al. ....................... | 455/433 |
| 2010/0192212 A1* | 7/2010 | Raleigh ........................... | 726/7 |

* cited by examiner

*Primary Examiner* — David Lazaro
*Assistant Examiner* — Sarah Drabik
(74) *Attorney, Agent, or Firm* — Coats and Bennett, P.L.L.C.

(57) ABSTRACT

A user device (110) is connected to a web server (120) via a network (130). An owner (140) communicates with the web server and has a communication channel (141) to the user device. The owner initiates an URI assignment request to the user device and obtains the device credentials via the communication channel (141). The owner provides the credentials to the web server via a communication channel (121). The web server sends the credentials to the user device which compares the credentials with its memory (110a) and replies with the URI status. The web server sends the URI assignment to the user device which accepts and confirms back to the web server which sends a locking message to the user device. The owner can revoke the URI using a password that is verified by the user device, which deletes the URI. An advantage is that the owner can acquire the URI without being the owner of domain.

20 Claims, 7 Drawing Sheets

METHOD AND DEVICE FOR UNIFORM RESOURCE IDENTIFIER HANDLING OF USER DEVICE

TECHNICAL FIELD

The present invention relates to Uniform Resource Identifier registration in a telecommunication network, and more particularly, to a method and device for assignment and revocation of such Uniform Resource Identifier registration of user device.

BACKGROUND ART

With the expansion of the internet, more and more user devices and electronic appliances are connected to the internet. It is expected that the user devices and the electronic appliances can exchange information with little manual user intervention. The internet web will not only be used to present information to the user, but also used for machines to communicate with each other.

A number of standardization efforts have been done to achieve the vision of a semantic web e.g. the standard Semantic Web Activity (W3C). This semantic web is a web of data, utilizing common formats for integration and combination of data drawn from diverse sources. It also standardizes the common language for recording how the data relates to the real world objects. One of the basic requirements is to provide a Uniform Resource Identifier (URI) to each individual resource on the internet web. Consequently, every resource on the web needs a unique identity so that it can be identified and referred to in the communication process. The network connected user devices and electronic appliances belong to the main group of resources to be used. The W3 C and The Internet Task Force (IETF) defined standards, and these standards defined the usage and format of the URI.

In U.S. Pat. No. 6,654,796-B1, a method involves assigning an IP address for a cluster, and establishing a hypertext transfer protocol (HTTP) connection from a management station to a network device. A network device management request with the URI indicating the network device and management data is received. A forwarding HTTP connection is established from the network device to an expansion network device indicated by the URI.

SUMMARY

Well defined Uniform Resource Identifier (URI) assigning and revocation procedures have not been described. It is up to each web server owner to use their own domain name for the URI assignment and revocation procedures. The majority of device owners do not own any domain; there has not been a way for them to assign or revoke URI's to their user devices. The user device can be exemplified by a mobile phone, a laptop computer, a desktop computer, a television set, a file server MP3 player, and a digital camera. These user devices can be used i.e. in a home environment, in public places, or in a car. The electronic appliances can be exemplified by a refrigerator, a washing machine, a dishwashing machine, and various other kitchen machines. There can be some overlap between the user devices and the electronic appliances, such as the television set. In the present description the expression 'user device' covers both an user apparatus devices and the electronic appliances.

An object of the invention is to present a handling procedure, an arrangement, an assignment procedure node and revocation procedure node for assigning and revoking the URI, which procedure is made for networked devices in an internet web. The user device resources will not only be identified and represented on the internet, they can also be reached and regulated on a network. They can provide or access the networked services. When the user device is connected to the internet, it will obtain the URI assigned by the user device owner. Further the user device owner will be denoted as an owner.

In a telecommunication network, the handling procedure, the arrangement, the assignment procedure node and said revocation procedure node are devised for handling the URI for the user device. The owner performs the handling via a web server wherein an IP connection is established between the web server and the user device. This handling procedure includes an assigning procedure of assigning said URI to said user device. The assigning procedure includes the steps of sending an assignment request with a credential message to the user device and sending an assignment response with a specification of the URI status of the user device. The procedure further includes sending an URI assignment to the user device and sending a locking message to lock the URI of the user device. Here the URI is a sub-domain of the web server.

An option is to store such said URI designations on said web server.

Another option is to provide a mechanism for assigning a plurality of said URI per said user device. Thus the user device can have multiple URI's, if it gets a first owner's permission and the user device capability supports it.

The handling procedure also as an option includes a revocation procedure for said URI of said user device by said owner via said web server. This revocation procedure further includes the steps of sending an unlock owner status request with a revoke URI message to the user device; and sending an unlock response with a revoke response of the user device. A further option is to provide for removing said URI on the web server.

Still another option is to provide a mechanism for removing said URI on a device memory.

Still another option is to provide a mechanism in the web server for generating a time limited code and sending said time limited code to the user device. In another option the web server has the mechanism for verifying the time limited code within a pre-determined time interval.

Thus a method for assigning and revocation of URI's for networked devices is provided with flexible procedure to update user devices with minimal impact on existing services. The owner that does not own a domain name can assign or revoke URI's.

In another aspect of the present invention, there are provisions for a assignment procedure node in the telecommunication network which is adapted for assigning at least one URI to said user device wherein the IP connection is established between the web server and the user device.

In another aspect of the present invention, there are provisions for a revocation procedure node in the telecommunication network which is adapted for revocation at least one URI to said user device wherein the IP connection is established between the web server and the user device.

The assignment procedure node has a first I/O means accessing the web server coupled via the network and a second I/O means connected to said user device for outputting an intrinsic information from said user device to said owner. Further the assignment procedure node has an assign request device connected to the first I/O means and the user device being adapted to send the assignment request with the credential message to the user device. The assignment procedure node further has an assign response device connected to the first I/O means and the user device, being adapted to send the assignment response with specification of the URI status of the user device. Further the assignment procedure node has an URI assign device connected to the first I/O means and the user device, being adapted to send for sending the URI assignment to the user device; and further a locking message device connected to the first I/O means and the user device, being adapted to send the locking message to lock the URI of the user device; wherein the URI is a sub-domain of the web server.

The revocation procedure node has a first I/O means accessing the web server coupled via the network and a second I/O means connected to said user device for communication from said user device to the owner. Further the revocation procedure node has an unlock status device connected to the first I/O means and the user device, being adapted to send the unlock owner status request with the revoke URI message to the user device. The revocation procedure node further has an unlock response device connected to the first I/O means and the user device, being adapted to send the unlock response with the revoke response of the user device.

BRIEF DESCRIPTION OF DRAWINGS

A more thorough understanding of the present invention is derived from the detailed specification along with the figures. The reference numbers in the figures are consistent with the reference numbers in the specification and the rest of the patent application.

DETAILED DESCRIPTION

The detailed description presents a handling procedure for assigning and revoking a Uniform Resource Identifier (URI) which procedure is devised for a networked arrangement for user devices and electronic appliances in an internet web. The user device can be exemplified by a mobile phone, a laptop computer, a desktop computer, a television set, a file server MP3 player, and a digital camera. These user devices can be used i.e. in a home environment, in public places, or in a car. The electronic appliances can be exemplified by a refrigerator, a washing machine, a dish washing machine, and various other kitchen machines. There can be some overlap between the user devices and the electronic appliances, such as the television set.

A networked device can be all the above said user device and/or said electronic appliance with communication capabilities with other the other devices and the electronic appliances. Different technologies could be used for communications such as Bluetooth, WLAN, UMTS, Wimax, NFC, and a Zigbee zone. Typical said networked devices are mobile phone, laptop, game console with network capabilities such as a PS3 console, a Wii console, a Xbox console, a PSP console, a file server, a Slingbox, and a Wifi camera. The user devices and the electronic appliances will be identified and represented on the internet. Further the user devices and the electronic devices can also be reached and regulated on a network by a device owner.

Figure 1:
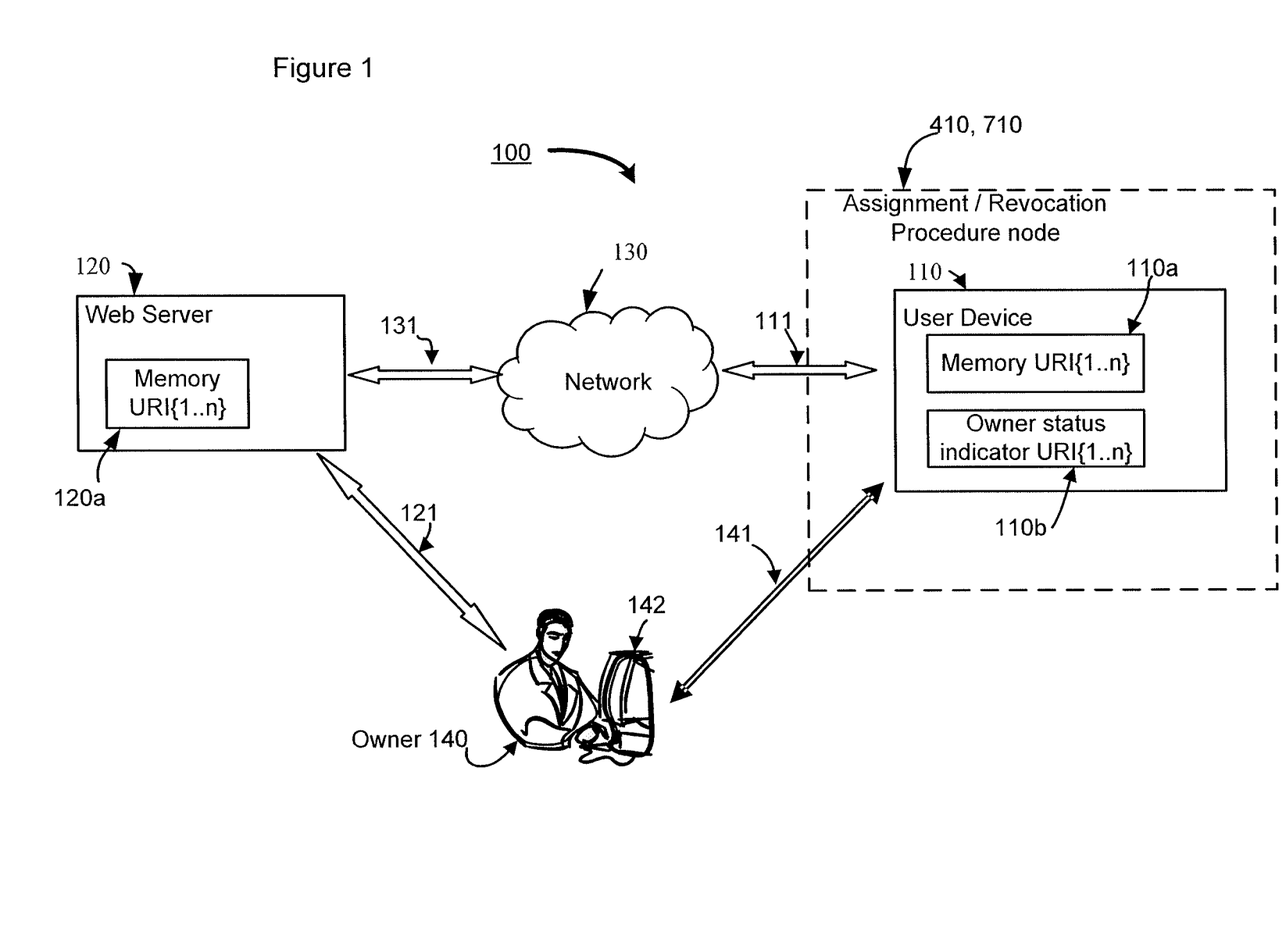
FIG. 1 shows a view over an arrangement for interworking between a user device, an assignment procedure node and revocation procedure node with a web server via a network.

FIG. 1 shows, an arrangement 100 according to present invention where said user devices and electronic appliances 110 is connected to a web server 120 coupled via a network 130. Further exists a communication channel 131 and a communication channel 111 for communication between said web server 120 and the network 130, and the user device and electronic appliances 110 and the network 130 respectively. Further there is a secondary communication channel 121 between said web server 120 and the device owner 140 and/or a communication device 142 for communication with the web server 120 among others. The communication device 142 is able to communicate with the web server 120 in either an autonomous or a semi-autonomous manner with assistance of the device owner 140. There exists a third communication channel 141 between the user device and electronic appliances 110 and said device owner 140 and/or the communication device 142. As will be explained later in various alternatives, their exists a possibility where the device owner 140 can directly or by using the communication device 142, can access the user device and the electronic appliance 110. Further the communication device 142 can access the user device and the electronic appliance 110 in either an autonomous manner or semi-autonomous manner. For all practical purposes, the device owner 140 is synonymous with the communication device 142 unless if important will be highlighted.

For clarity, the word a user device hence forward is to represent both user device and electronic appliance 110 as noted above. Further a user device will be also denoted as a personal device and a networked device. Further the device owner 140 will be denoted as an owner and/or a controller depending on different phase of the handling procedure and ownership. Any user may be the controller of the user device. Once the URI has been assigned, the controller becomes the owner of the user device.

The user device has a device memory 110a allocated to store its URI and a status indicator 110b to indicate if the user device currently is locked to an owner. A new user device does not have said URI, it has to connect via said network 130 to a web server 120 to obtain its URI as illustrated in FIG. 1.

When the networked device is connected to the network 130, it will function as a normal networked device to establish for example an IP connection with other network nodes. However, it does not have an URI. Therefore, it cannot be identified and be referred to in a semantic web context. To obtain an URI, the user device needs to establish a connection using the first communication channel 111,131 with the web server 120 through the network 130. The transport protocol could be a Transmission Control Protocol (TCP), a User Datagram Protocol (UDP) or any other appropriate protocol. Security can be achieved by using a IP security (IPSec), a Transport Layer Security (TLS), a Secure Sockets Layer (SSL) or other security protocols. When said user device is connected to the internet, it will obtain the URI assigned by said owner.

The controller has the authority to create and modify user device related content in the web server 120. The owner does this using the communication device 142 and connecting to the web server 120 using a secondary communication channel 121. The owner can be a proprietor of the web server 120. The proprietor of web server 120 can be a service provider which provides URI registration services. The owner can also have a personal account at the web server 120 so that he can manage the personal devices. In general, the owner does not need to own any domain.

The network 130 can be any kind of network, such as a Wide Area Network (WAN), a cellular network, or a Local Area Network (LAN). The connection, the third communication channel 141 between the user device and the owner and/or the communication device 142 can comprise a Bluetooth, a Near Field Communication (NFC), or a Universal Serial Bus (USB) cable connectivity. This entails also that the user device has necessary hardware and software capability within or connected externally to achieve the above mentioned functionality.

In another option, the communication device 142 could even be located inside/connected to the user device 110. The user device can provide a communication interface toward the owner/controller, for example, through a web browser functionality of the communication device 142. In such case, the third communication channel 141 may become an internal communication channel of the user device.

In another option, the communication channel 141 also includes that the owner 140 in person may read a label on the user device 110 with a device identifier to acquire the URI assignment.

An URI is an identity for a resource on the web. It is uniform for all kinds of resources, no matter if it is a human, a computer, or even an abstract concept. It is also globally unique. One URI can only mean one thing and it is specified by the owner of the URI. However, one resource can have several URI's and it is possible to specify that one URI is the same as another. The structure of URI provides not only an identity of the resource but also the possibility to access the description of the resource. The networked device may use several access technologies at the same time and it has different identity in different access networks, for example, phone number, sip address, IP address, email address, etc. A Resource Description Framework (RDF) file stored at the URI location should include the information. The user device can not be accessed using its URI only; the description file provides information on how the user device can access or provide services.

In the telecommunication network, a handling procedure is devised for handling the URI for the user device. This handling procedure will be described in connection with FIG. 2, which shows the owner 140, the web server 120, the network 130 and the user device 110. A number of generic signalling and procedural steps are performed as will be described below. More specific embodiments with respect to aspects relating to a secure communication between the owner and the user device and subsequent acquiring of a device credentials will be dealt with in later part of the description.

Figure 2:
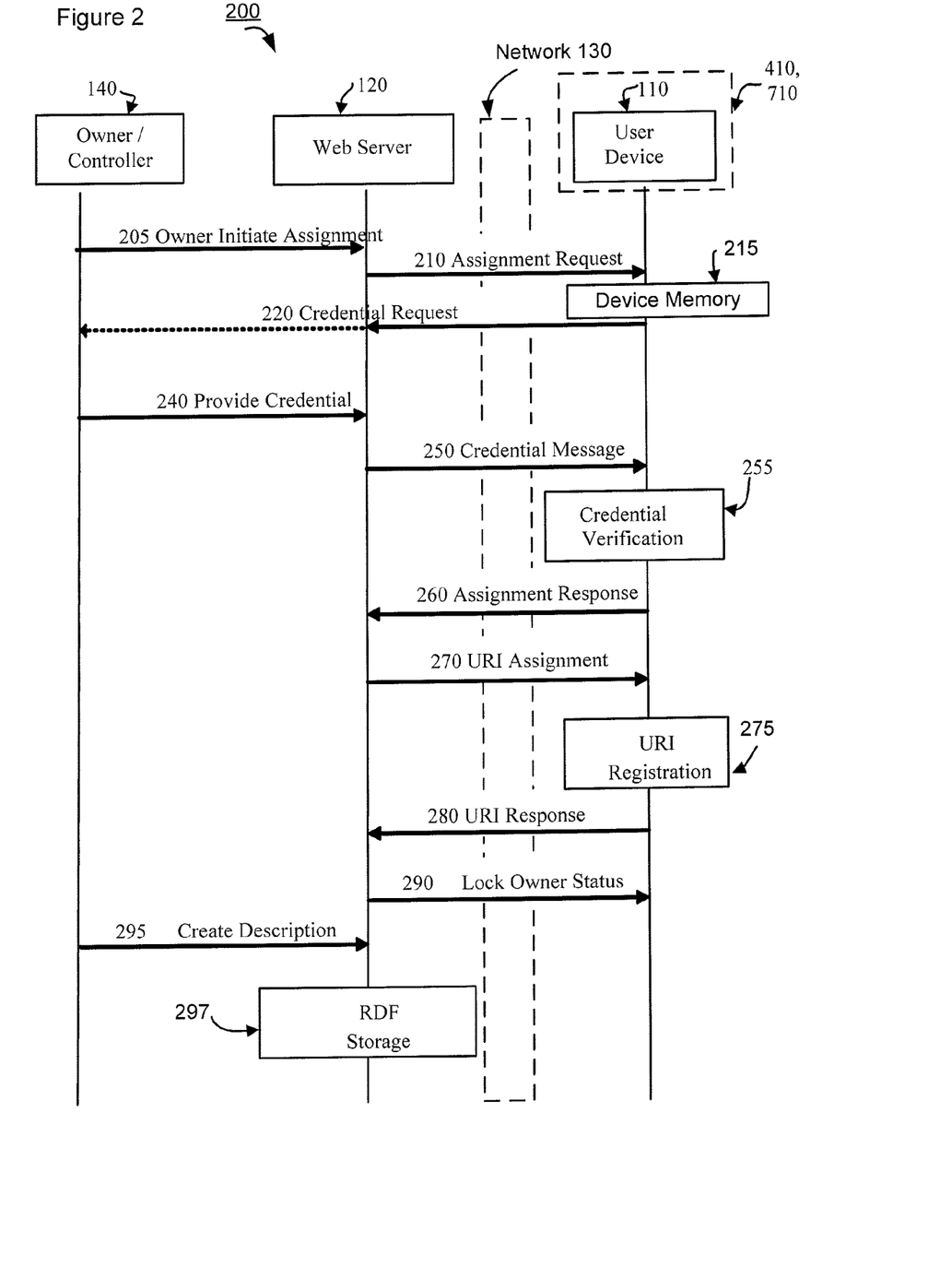
FIG. 2 is a signalling diagram showing an assigning procedure for a Uniform Resource Identifier (URI).
Figure 5:
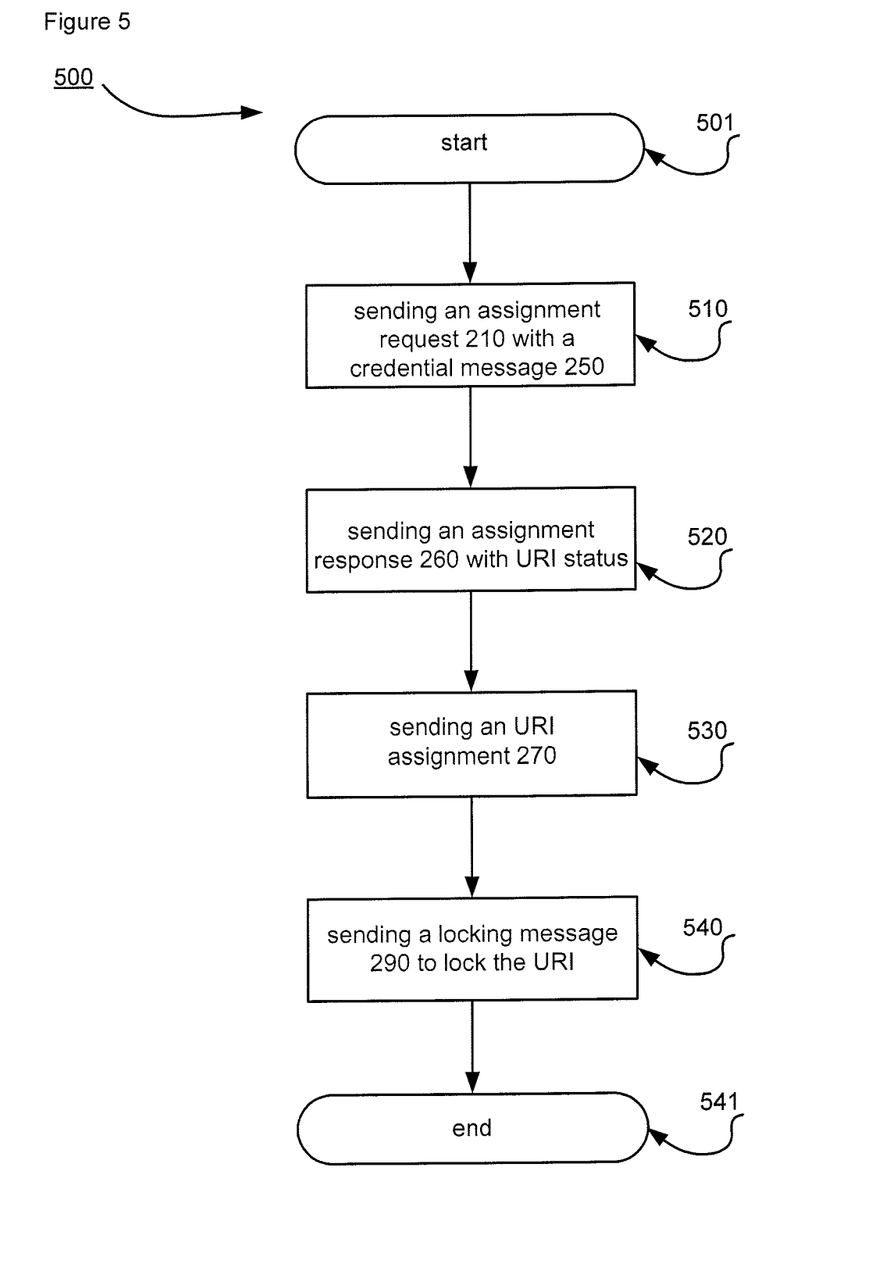
FIG. 5 shows a flow diagram for a URI assigning procedure.

The owner performs the handling via said web server 120 wherein said IP connection is established between the web server 120 and the user device. This handling procedure 200 includes an assigning procedure of assigning said URI to said user device. The assigning procedure in short is shown in a flow diagram 500 in FIG. 5. It starts in a step 501 and includes the step 510 of sending an assignment request 210 with a credential message 250 to the user device. In step 520, the procedure of sending an assignment response 260 with a specification of the URI status of the user device. The procedure further in step 530 includes sending an URI assignment 270 to the user device. Finally in step 540, sending a locking message 290 to lock the URI of the user device and the procedure ends with step 541. Here the URI belongs to a sub-domain of the web server 120.

FIG. 2 illustrates the URI assigning procedure 200 in detail. A prerequisite is that a connection has established between the web server 120 and the user device as described above. The connection can be initiated by the user device to the web server 120 with the information of the owner so that only the owner can use the connection. The connection can also be initiated by the web server 120. When the owner logs in to the web server 120, the owner can instruct the web server 120 to send a connection request to an IP address of the user device which is known by the owner. The handling procedure then starts with the owner or any person trusted by the owner logs in to the URI registration web server 120. In step 205, the owner initiates the action of URI registration. In step 210, the web server 120 sends an assignment request to the user device. The user device checks its device memory 110*a* and evaluate if it is a valid request in step 215. If the owner status indicator 110*b* of the user device is not empty, the user device will reject the request with step 260, informing that the assignment response is "failed".

Otherwise, the user device requests the credentials from the web server 120 in a step 220 that forwards the request to the owner. The owner can obtain the credentials by obtaining the intrinsic information in the form of reading a label on the user device or obtaining it from the manufacture. The owner can also obtain the credentials via short range radio such as the Bluetooth, the NFC, RFID, or by connecting the Universal Serial Bus USB cable to the communication device 142. The credential can be a tag generated by the user device with a one-time time-limited code. The owner can also acquire such information by simply reading it on a label on the user device or a device literature from a device manufacturer. The embodiments relating to above will be dealt in detail in subsequent text. In step 240, the owner provides the credentials (codes) to the web server 120. The web server 120 responses the user device with the requested credential message in the step 250. The user device verifies the recovered credentials (codes) in step 255 by comparison with the credentials in the device memory 110*a*. If it is acceptable, the user device will response with assignment accepted in step 260. Otherwise, it will response with the "failed" message.

The web server 120 sends the URI assignment to the user device in step 270. The URI has to belong to the sub-domain of the web server 120 so that it can be reached from the Internet and its content can be modified by the owner. For example, if the web server 120 has a domain name: "webserver2007.com", the URI can be the format of "http://webserver2007.com/owner01/device05". In step 275, the user device stores the assigned URI in its device memory 110*a* which e.g. can be a ROM memory type so that it is resistant to power loss. In step 280, the user device responses to the web server 120 with a "success" message or a "failed" message if the storage process is not completed correctly. When the web server 120 receives the "success" response, it will lock the owner status in step 290 with the locking message. The owner status can be locked with the owner defined password and/or a connection to the web server 120 so that it can only be unlocked from the specified web server 120. In step 295, the owner creates the description file to the user device and stores it as the RDF file at the location pointed by URI in step 297. The description file can contain the owner information, the user device capability and communication protocols. It can also contain alternative URI's assigned by other users and agreed by the owner.

An URI is an identity for a resource on the web. It is uniform for all kind of resources, no matter if it is a human, a computer, or even an abstract concept. It is also globally unique. One URI can only mean one thing and it is specified by the owner of the URI. However, one user device can have several URI's and it is possible to specify that one URI is the same as another. The structure of URI provides not only an identity of the user device but also the possibility to access the description of the user device. The networked device may use several access technologies at the same time and it has different identity in different access networks, for example, phone number, sip address, IP address, email address, etc. The RDF file stored at the URI location should include the information. The user device can not be accessed using its URI only; the description file provides information on how the user device can access or provide services.

In the following text, two embodiments will be discussed providing specific steps pertaining to the owner acquiring device credentials. According to a first embodiment, any user may be the controller of the user device. Once the URI has been assigned, the controller becomes the owner of the user device, i.e. no one else has access to change the device memory 110a and the status indicator 110b. According to a second embodiment, ownership of a user device is determined initially, exemplary at acquisition of said user device. Further details follow below.

Next, the first embodiment is discussed in detail. It is observed that any user having the device identifier can perform the assigning procedure and there is no requirement that the user in question is located close to the user device when performing the URI assignment. Having obtained the device identifier, the assigning procedure can be executed anytime.

Therefore, to safeguard against such intrusion, the assigning procedure is arranged such that the controller must be located close to the user device for the assigning procedure to take place. So there exists a mechanism in the web server 120 for generating a time limited code and sending said time limited code to the user device 110 via the network 130. As an example, the assigning procedure comprises the following basic steps. In step one, to locate the controller close to the user device in order to read a tag (e.g. using RFID; NFC to acquire an intrinsic information). In step two, to perform steps 250 and 260. In step 250, the web server 120 may send a one time code along with the tag details. Alternatively, the web server 120 may repeat step 250 multiple times to send the one time code separately from the tag details.

In step three, just before execution of step 270, the web server 120 may request the controller to read the tag and respond within a pre-determined (short) time interval to the web server 120 along with the code. If the web server 120 verifies the code, the procedure continues to perform the step 270 and consequent steps in signaling diagram 200 in FIG. 2. So the web server 120 has the mechanism for verifying the time limited code within a pre-determined time interval. Otherwise, perform a revoke assignment and send error message to the controller. After step 290 send acknowledgement to controller that assignment is complete and user device is locked. In another option, the user device may confirm the controller's proximity to the web server 120.

The assigning procedure can only be completed by the controller being in the proximity to the user device for receiving an acknowledgement of completed assignment. The problem is thus avoided for a possible intrusion by a unwanted user locking the user device that said owner has acquired for installation in a home environment and said URI assignment is not completed.

In another exemplary option, if the user device is capable of loading the tag with the code, it may be utilized in the credential verification step 255. The controller reads the tag and provides the code to the web server 120 for verification that the controller is in the proximity of the user device. The tag which may be outputted for one time use, may be generated by the user device internally or by a third party trusted service provider.

According to the second embodiment, ownership is established at acquisition of the user device. The device credentials are stored in a tamper proof area of the user device and are basically secret, i.e. it can not be read on a device interface.

The owner obtains the device credentials through some means that fulfills necessary security and integrity. In another option, the owner obtains the device credentials through a secure connection to a device seller's server and installs it in a tamper proof area of a mobile phone (e.g. SIM-card).

Thereafter, steps 240 and onwards are performed in the signaling diagram 200 in FIG. 2.

According to the above embodiment, the assignment procedure requires the controller to have access to the device credentials. The problem of proximity to the user device during assignment is not relevant here as above but is solved in an alternate way.

In another option the credentials provided in step 240 are stored with the web server 120 in an owner private area whereby any user, capable of connecting to the web server and having a valid password, may use the device credentials to authenticate for update of the device memory 110a and the status indicator 110b.

Further in an embodiment there are provisions for storing such said URI designations in a web server memory 120a of said web server 120.

In still another embodiment, there exists a mechanism for assigning a plurality of said URI per said user device. FIG. 1 shows the possibility of storing in multiple URI{1 . . . n} both in the user device and the web server 120. Thus the user device can have multiple URI's, if it gets a first owner's permission and the user device capability supports it. Different URI can be assigned by different URI owners. Other URIs have to be added by the owner to a URI description RDF file and possibly also in the device memory 110a, if the user device capability supports it. Other URI's are generally assigned on other web servers by the users who are not defined as the owner. Since it is not possible to assign URI to the user device directly when the status indicator 110b of the user device is already locked. The additional URIs can only be added to the URI description file by the owner to indicate that there are other valid URIs for the user device.

Figure 6:
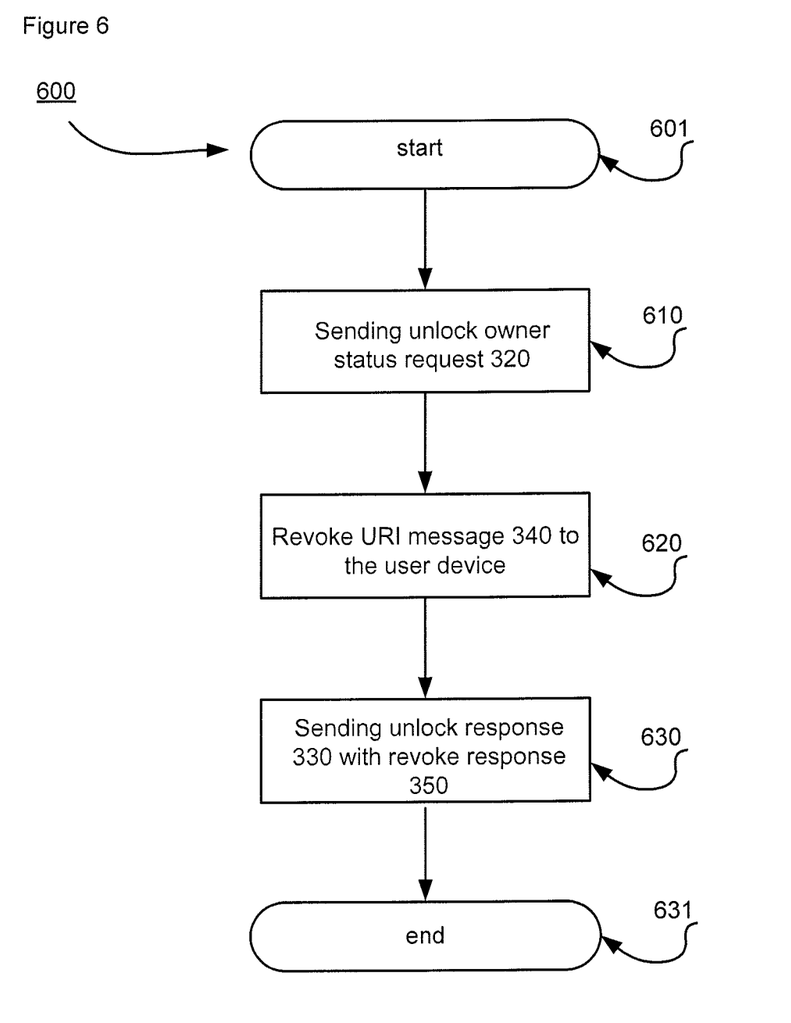
FIG. 6 shows a flow diagram for a URI revocation procedure.

The handling procedure also includes a revocation procedure, which in short is shown in the flow diagram 600 in FIG. 6. The revocation procedure is for a revocation of said URI of the user device by the owner via the web server 120. It starts in step 601, and further in step 610, the web server 120 sends an unlock owner status request to the user device. In step 620, web server 120 sends a revoke URI message to the user device. Finally in step 630, the user device sends an unlock response with a revoke response of the user device and the procedure ends with step 631.

Figure 3:
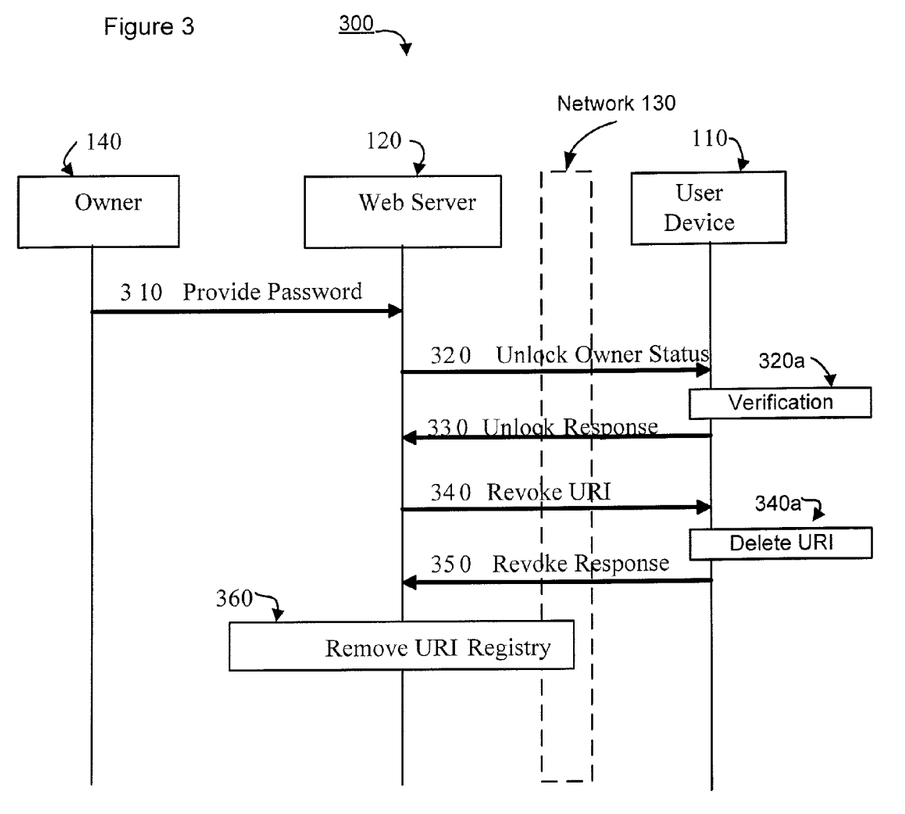
FIG. 3 shown a signalling diagram over a revocation procedure.

The revocation procedure is illustrated in FIG. 3 in detail steps 300. The owner provides a locking password to the web server 120 in a step 310. This revocation procedure further includes the web server 120 coupled via the network 130 sending said unlock owner status request to the user device in a step 320. The user device in step 320a, verifies the password within its device memory 110a and the owner status indicator 110b. If it is successful, said user device unlocks the owner status and sends a "success" or said unlock response in step 330. Otherwise, if the password is incorrect the said user device sends a "failed" response in step 330. With the unlock response in step 330, the web server 120 sends a revocation request or said revoke URI message in step 340 to the user device. The user device deletes the URI from the device memory 110a in step 340a and sends a confirmation in a said revoke response to the web server 120 in step 350. After a successful revocation, web server 120 removes the URI registry in step 360. After this procedure, the aforementioned URI is no longer a valid URI. The procedure can be used to have a multiple revocation procedure in case there are multiple URI entries stored in the user device. The procedure can only be used for the main URI. Other URIs are updated through modifying the URI description file.

Thus the method and arrangement for the handling procedure, comprising the assigning and revocation of said URI's for said user devices, is provided with flexible procedure to update said user devices with minimal impact on existing services. Further the owner that does not own a domain name can assign or revoke URI's. The description about the URI of said user device can only be changed by its owner. The user device can only be contacted by the means specified by the URI description.

Figure 4:
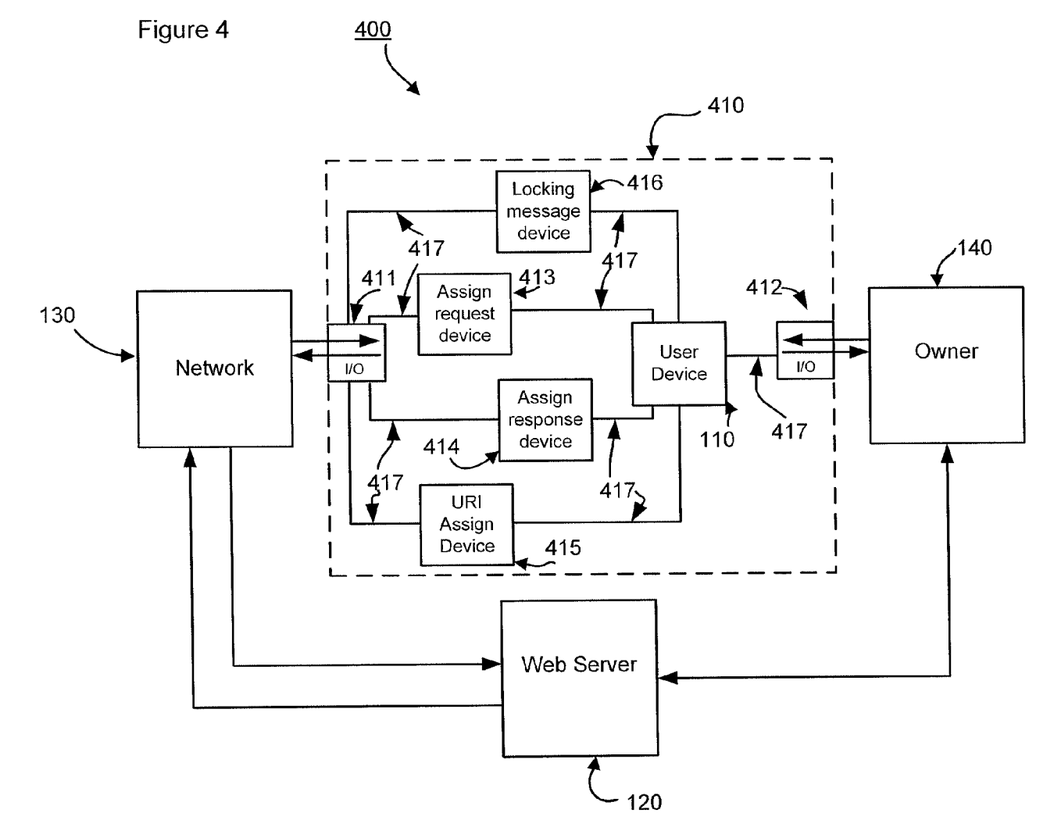
FIG. 4 shows a block schematic over an assignment procedure node.

In another aspect of the present invention shown in FIG. 4, an arrangement 400, which has provisions for an assignment procedure node 410 in the telecommunication network. The assignment procedure node 410 is adapted for handling assigning of at least one URI to said user device wherein the IP connection is established between the web server 120 and the user device. This assignment procedure node 410 is adapted for the assigning of the URI for the user devices.

In FIG. 4, the assignment procedure node 410 is coupled to the web server 120 via the network 130. The assignment procedure node 410 is connected with the network 130 via a first I/O means 411. Further the assignment procedure node 410 has a secondary I/O means 412 to communicate with the owner 140 and the communication device 142. The assignment procedure node 410 comprises further the user device 110, an assign request device 413, an assign response device 414, an URI assign device 415 and finally a locking message device 416.

A bus 417 connects the aforementioned devices 411, 412, 413, 414, 415, 416 within the assignment procedure node 410. The bus 417 can be imbedded in a hardware or a software scheme within the assignment procedure node 410. Further the bus 417 can be implemented in a wire line or a wireless scheme within the assignment procedure node 410.

The second I/O means 412 is connected via the bus 417 to said user device for outputting the intrinsic information from said user device to the owner.

This second I/O means 412 may use the Bluetooth, the NFC, or by connecting the Universal Serial Bus USB cable to the communication device 142. The owner can also acquire such information by simply reading it on a label on the user device or from the device literature from the device manufacturer.

The assign request device 413 is connected via the bus 417 to the first I/O means 411 and the user device. The assign request device 413 is adapted to send the assignment request 210 with the credential message 250 to the user device. Further the assign response device 414 is connected via the bus 417 to the first I/O means 411 and the user device. The assign response device 414 is adapted to send the assignment response 260 with specification of the URI status of the user device.

The URI assign device 415 is connected via the bus 417 to the first I/O means 411 and the user device. The URI assign device is adapted to send the URI assignment 270 to the user device. The locking message device 416 is connected via the bus 417 to the first I/O means 411 and the user device 110. The locking message device 416 is adapted to send the locking message 290 to lock the URI of the user device. Further the URI belongs to a sub-domain of the web server 120.

It is to be understood that the various embodiments discussed with respect to the signalling diagram 200 of the FIG. 2 can be provided for by the assignment procedure node with minimal adaptations.

Figure 7:
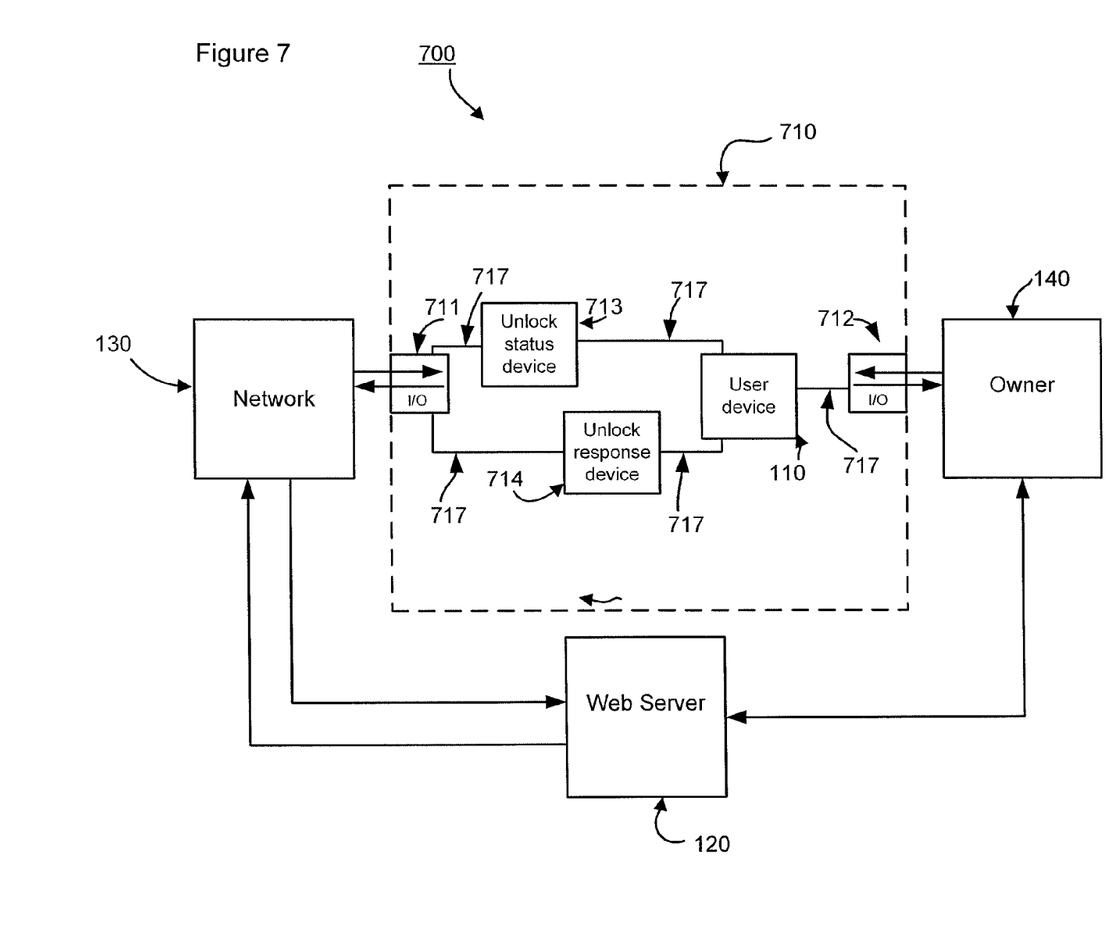
FIG. 7 shows a block schematic over a revocation procedure node.

In another aspect of the present invention shown in FIG. 7, an arrangement 700, which has provisions for an revocation procedure node 710 in the telecommunication network. The revocation procedure node 710 is adapted for handling revocation of at least one URI to said user device wherein the IP connection is established between the web server 120 and the user device. This revocation procedure node 710 is adapted for the revocation of the URI for the user devices.

In FIG. 7, the revocation procedure node 710 is coupled to the web server 120 via the network 130. The revocation procedure node 710 is connected with the network 130 via a first I/O means 711. Further the revocation procedure node 710 has a secondary I/O means 712 to communicate with the owner 140 and the communication device 142. The revocation procedure node 710 comprises further the user device 110, an unlock status device 713, an unlock response device 414.

A bus 717 connects the aforementioned devices 711, 712, 713, 714 within the revocation procedure node 710. The bus 717 can be imbedded in a hardware or a software scheme within the revocation procedure node 710. Further the bus 717 can be implemented in a wire line or a wireless scheme within the revocation procedure node 710.

The second I/O means 712 is connected via the bus 717 to said user device 110 for communication from said user device to the owner. This second I/O means 712 may use the Bluetooth, the NFC, or by connecting the Universal Serial Bus USB cable to the communication device 142.

The unlock status device 713 is connected via the bus 717 to the first I/O means 711 and the user device. The unlock status device 713 is adapted to send the unlock owner status request 320 with the revoke URI message 340 to the user device. Further the unlock response device 714 is connected via the bus 717 to the first I/O means 711 and the user device. The unlock response device 714 is adapted to send the unlock response 330 with the revoke response 350 of the user device.

Further the URI belongs to a sub-domain of the web server 120. It is to be understood that the various embodiments discussed with respect to the signalling diagram 300 of the FIG. 3 can be provided for by the revocation procedure node 710 with minimal adaptations.

The invention claimed is:

1. A method in a telecommunication network for handling assignment and revocation of at least one Uniform Resource Identifier (URI) of a user device by a device owner via a web server, an IP connection having been established between the web server and the user device; the method comprising assigning said URI by:
   sending an assignment request with a credential message to the user device, the assignment request requesting the user device be assigned one or more URIs;
   sending an assignment response with specification of a URI status of the user device;
   assigning a URI to the user device and sending the URI assignment to the user device, wherein the URI is a sub-domain of the web server; and
   sending a locking message to lock the URI of the user device.

2. The method according to claim 1, including storing said URI on said web server.

3. The method according to claim 1, including storing said URI on a device memory.

4. The method according to claim 1, including assigning a plurality of URIs to said user device.

5. The method according to claim 1, the method further comprising revoking said URI by:
sending an unlock owner status request with a revoke URI message to the user device; and
sending an unlock response with a revoke response of the user device.

6. The method according to claim 5, wherein assigning said URI comprises storing said URI on said web server, and wherein revoking said URI comprises removing said URI on the web server.

7. The method according to claim 5, wherein assigning said URI comprises storing said URI on a device memory, and wherein revoking said URI comprises removing said URI on the device memory.

8. The method according to claim 1, further comprising the web server generating a time limited code and sending said time limited code to the user device.

9. The method according to claim 1, further comprising the web server verifying a time limited code within a pre-determined time interval.

10. An assignment procedure node in a telecommunication network for handling assignment and revocation of at least one Uniform Resource Identifier (URI) of a user device based on an IP connection being established between a web server and the user device, wherein the assignment procedure node is configured to assign said URI and comprises:
a first input/output (I/O) interface circuit configured to access the web server via a network;
a second I/O interface circuit configured to communicate with said user device for outputting intrinsic information from said user device to a device owner;
an assign request circuit connected to the first I/O interface and the user device, and configured to send an assignment request with credential message to the user device, the assignment request requesting the user device be assigned one or more URIs;
an assign response circuit configured to communicate with the first I/O interface and the user device, and configured to send an assignment response with specification of a URI status of the user device;
an URI assign circuit configured to communicate with the first I/O interface and the user device, and configured to assign an URI to the user device and to send a URI assignment to the user device, wherein the URI is a sub-domain of the web server; and
a locking message circuit connected to the first I/O interface and the user device, and configured to send a locking message to lock the URI of the user device.

11. A revocation procedure node in a telecommunication network for handling assignment and revocation of at least one Uniform Resource Identifier (URI) of a user device based on an IP connection being established between a web server and the user device, wherein the revocation procedure node is configured to revoke said URI and comprises:
a first input/output (I/O) interface circuit configured to access the web server via a network;
a second I/O interface circuit configured to communicate with said user device for communication from said user device to a device owner;
an unlock status circuit configured to communicate with the first I/O interface and the user device, and configured to send an unlock owner status request with a revoke URI message to the user device, the unlock owner status request requesting that an owner status of the user device be unlocked so that the user device will no longer be locked to an owner and the revoke URI message requesting or directing revocation of at least one URI of the user device that was previously assigned to the user device in response to an assignment request, sent to the user device, comprising a credential message and requesting the device to be assigned one or more URIs; and
an unlock response circuit configured to communicate with the first I/O interface and the user device, and configured to send an unlock response with a revoke response of the user device.

12. A method implemented by a web server for assigning one or more Uniform Resource Identifiers (URIs) to a user device, the method comprising:
sending to the user device an assignment request that requests the device be assigned one or more URIs;
sending to the user device a credential message;
receiving from the user device an assignment response indicating that the user device will accept assignment of one or more URIs;
assigning one or more URIs to the user device that each comprises a sub-domain of the web server;
sending an indication of the assigned one or more URIs to the user device; and
sending a locking message to the user device that locks the one or more URIs of the user device.

13. The method of claim 12, further comprising:
receiving from the user device, responsive to having sent said assignment request, a credentials request that requests credentials verifying permission to assign one or more URIs to the user device;
sending said credentials in said credential message to the user device responsive to said credentials request; and
wherein receiving said assignment response occurs responsive to having sent said credentials.

14. The method of claim 12, further comprising generating a time limited code and sending said time limited code to the user device.

15. The method of claim 12, further comprising receiving input from a user of the user device and verifying that the input corresponds to the time limited code sent to the user device, thereby verifying a proximity of the user to the user device.

16. The method of claim 12, further comprising revoking the one or more URIs assigned to the user device by:
sending to the user device an unlock owner status request with a revoke URI message; and
receiving an unlock response with a revoke response of the user device.

17. The method of claim 12, wherein assigning said URI comprises storing said URI on said web server, and wherein the method further comprises revoking said URI by removing said URI on the web server.

18. A web server for assigning one or more Uniform Resource Identifiers (URIs) to a user device, the web server comprising one or more processing circuits configured to:
send to the user device an assignment request that requests the device be assigned one or more URIs;
send to the user device a credential message;
receive from the user device an assignment response indicating that the user device will accept assignment of one or more URIs;
assign one or more URIs to the user device that each comprises a sub-domain of the web server;
send an indication of the assigned one or more URIs to the user device; and send a locking message to the user device that locks the one or more URIs of the user device.

19. The web server of claim 18, wherein the one or more processing circuits are further configured to:
receive from the user device, responsive to having sent said assignment request, a credentials request that requests credentials verifying permission to assign one or more URIs to the user device;
send said credentials in said credential message to the user device responsive to said credentials request; and
receive said assignment response responsive to having sent said credentials.

20. The web server of claim 18, wherein the one or more processing circuits are further configured to:
generate a time limited code;
send said time limited code to the user device;
receive input from a user of the user device; and
verify that the input corresponds to the time limited code sent to the user device, thereby verifying a proximity of the user to the user device.

\* \* \* \* \*